(12) United States Patent
Kim et al.

(10) Patent No.: US 9,021,793 B2
(45) Date of Patent: May 5, 2015

(54) METHOD FOR CONVERTING CONSTITUENT GASES IN AN INTERNAL COMBUSTION ENGINE EXHAUST GAS MIXTURE AND A VEHICLE INCORPORATING THE SAME

(75) Inventors: Chang H. Kim, Rochester, MI (US); Eugene V. Gonze, Pinckney, MI (US); Chandra S. Namuduri, Troy, MI (US); Kenneth J. Shoemaker, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 13/601,184

(22) Filed: Aug. 31, 2012

(65) Prior Publication Data

US 2012/0324868 A1  Dec. 27, 2012

Related U.S. Application Data

(63) Continuation-in-part of application No. 13/153,711, filed on Jun. 6, 2011.

(51) Int. Cl.
  *F01N 3/10* (2006.01)
  *F01N 3/08* (2006.01)
  (Continued)

(52) U.S. Cl.
  CPC ............ *F01N 3/0835* (2013.01); *F01N 3/0871* (2013.01); *F01N 3/2013* (2013.01); *F01N 3/2066* (2013.01); *F01N 9/00* (2013.01); *F01N 2240/16* (2013.01); *F01N 2610/02* (2013.01); *F01N 2610/03* (2013.01); *F01N 2900/1602* (2013.01); *B60W 10/06* (2013.01); *B60W 10/26* (2013.01); *B60W 10/30* (2013.01); *B60W 30/18127* (2013.01); *B60W 2030/1809* (2013.01); *B60Y 2300/474* (2013.01); *B60Y 2400/114* (2013.01); *Y02T 10/54* (2013.01); *Y02T 10/26* (2013.01); *Y02T 10/47* (2013.01); *Y02T 10/24* (2013.01); *F01N 13/009* (2013.01)

(58) Field of Classification Search
  CPC ............ F01N 2240/16; F01N 2550/22; F01N 2900/0602
  USPC ............................ 60/274, 275, 286, 300, 303
  See application file for complete search history.

(56) References Cited

U.S. PATENT DOCUMENTS

| | | | | |
|---|---|---|---|---|
| H1113 H | * | 12/1992 | Yoshizaki | 60/284 |
| 7,007,460 B2 | * | 3/2006 | Frieden et al. | 60/284 |
| 7,100,362 B2 | * | 9/2006 | McGee et al. | 60/284 |
| 8,151,555 B2 | * | 4/2012 | Niimi et al. | 60/286 |

(Continued)

*Primary Examiner* — Binh Q Tran
(74) *Attorney, Agent, or Firm* — Dierker & Associates, P.C.

(57) ABSTRACT

A vehicle includes an internal combustion engine operatively disposed therein. The engine generates exhaust gases. The vehicle further includes an alternator operatively connected to the engine. The alternator produces DC power. An ultracapacitor is operatively connected to the alternator to receive electrical energy therefrom. The vehicle still further includes an exhaust gas treatment system operatively connected to the engine to receive exhaust gases therefrom. The exhaust gas treatment system includes an electrically heated catalyst (EHC) device electrically connected to the ultracapacitor to selectively heat a catalytic exhaust system component. The ultracapacitor stores energy converted by the alternator from vehicle kinetic energy and releases the stored energy to heat the EHC.

18 Claims, 3 Drawing Sheets

(51) Int. Cl.
  *F01N 3/20*  (2006.01)
  *F01N 9/00*  (2006.01)
  *B60W 10/06* (2006.01)
  *B60W 10/26* (2006.01)
  *B60W 10/30* (2006.01)
  *B60W 30/18* (2012.01)
  *F01N 13/00* (2010.01)

(56) References Cited

U.S. PATENT DOCUMENTS

| | | | |
|---|---|---|---|
| 8,190,740 B2 * | 5/2012 | Stienhans et al. | 709/224 |
| 8,437,898 B2 * | 5/2013 | Hashimoto | 701/22 |
| 8,473,177 B2 * | 6/2013 | Madurai Kumar et al. | 701/101 |
| 8,565,957 B2 * | 10/2013 | Ang | 701/22 |

* cited by examiner

METHOD FOR CONVERTING CONSTITUENT GASES IN AN INTERNAL COMBUSTION ENGINE EXHAUST GAS MIXTURE AND A VEHICLE INCORPORATING THE SAME

CROSS-REFERENCE TO RELATED APPLICATIONS

This application is a continuation-in-part of co-pending U.S. patent application Ser. No. 13/153,711, filed Jun. 6, 2011, which is incorporated by reference herein in its entirety.

TECHNICAL FIELD

The present disclosure relates generally to methods and systems for reducing $NO_x$ concentration in internal combustion engine exhaust gas.

BACKGROUND

Internal combustion engine exhaust gases may require after treatment to control emissions. An oxidation catalyst (OC) device may reduce carbon monoxide (CO) and unburned hydrocarbon (HC). A selective catalyst reduction (SCR) device may reduce $NO_x$ (a generic term for mono-nitrogen oxides NO (nitric oxide) and $NO_2$ (nitrogen dioxide)), and a particulate filter (PF) may reduce carbon and other particles in the exhaust gases. Both OC and SCR devices require an activation, or light-off, minimum temperature for operation. Higher temperature engine operation may help raise the OC and SCR temperatures to the minimum operation temperatures at the expense of fuel consumption. Electrical heating, by an electrically heated catalyst (EHC) device, may provide localized temperature benefits without excess fuel consumption. Electrical heating capacity may be limited by the operational limits of electrical supply components.

SUMMARY

A vehicle includes an internal combustion engine operatively disposed therein. The engine generates exhaust gases. The vehicle further includes an alternator operatively connected to the engine. The alternator produces DC power. An ultracapacitor is operatively connected to the alternator to receive electrical energy therefrom. The vehicle still further includes an exhaust system operatively connected to the engine to receive exhaust gases therefrom. The exhaust system includes an electrically heated catalyst (EHC) device electrically connected to the ultracapacitor to selectively heat a catalytic exhaust system component. The ultracapacitor stores energy converted by the alternator from vehicle kinetic energy and releases the stored energy to heat the EHC.

A method for converting constituent gases in an internal combustion engine exhaust gas mixture is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In a vehicle, fuel efficiency and engine exhaust emissions have been the subject of increasingly stringent regulation. Specifically, reduction of hydrocarbon and $NO_x$ emissions during cold-start has been a challenge. Disclosed herein is an example vehicle with an exhaust management system, including EHC (electrically heated catalyst), OC (oxidation catalyst), and SCR (selective catalyst reduction) devices, the EHC to receive energy from an ultracapacitor powered by regenerative braking.

Examples of the present disclosure may: (1) improve fuel economy by raising exhaust gas temperature with regenerative braking energy rather than fuel energy; (2) improve $NO_x$ reduction efficiency over SCR with electrically heated exhaust flow; and (3) release the regenerative power stored in the ultracapacitor when the engine runs idle and/or during extended cruise where low temperature exhaust gases cool down the SCR device.

Figure 1:
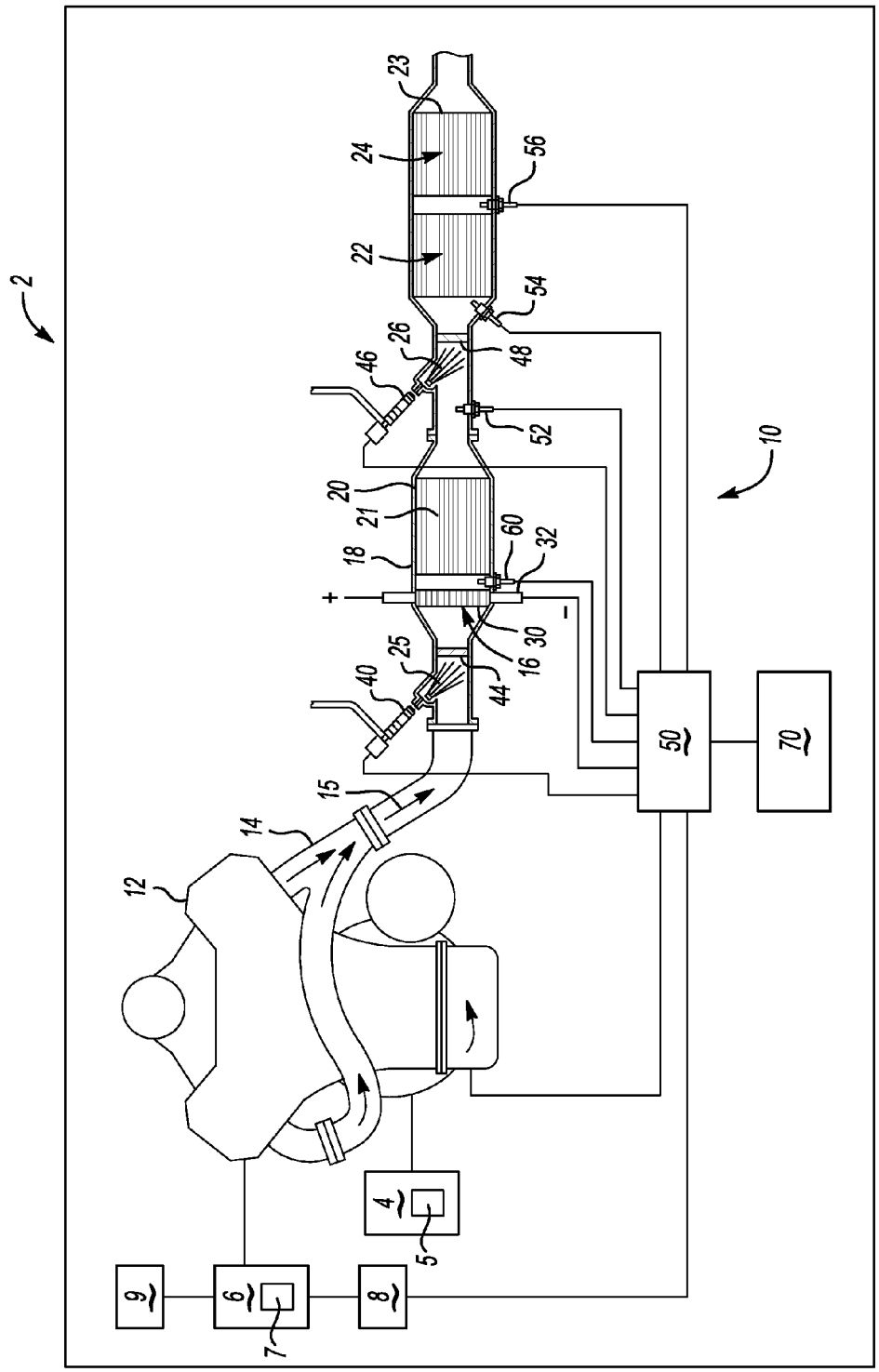
FIG. 1 is a schematic diagram depicting an example of some components of a vehicle according to the present disclosure.

Referring now to FIG. 1, an example vehicle 2 according to the present disclosure is shown having an exhaust gas treatment system 10, for the reduction of regulated exhaust gas constituents (e.g., $NO_x$ concentration) of an internal combustion (IC) engine 12. The exhaust gas treatment system 10 described herein can be implemented in various engine systems that may include, but are not limited to, diesel engine systems, gasoline direct injection systems, and homogeneous charge compression ignition engine systems.

In an example, the vehicle 2 of FIG. 1 includes an internal combustion engine 12 selectively connected to a drivetrain 4 by a clutch 5, the engine 12 operatively disposed within the vehicle 2. Engine 12 generates exhaust gases. An alternator 6 with a voltage regulator 7 is operatively connected to the engine 12 and produces DC power. The vehicle further includes an ultracapacitor 8 and battery 9, each operatively connected to the alternator 6 to receive electrical energy therefrom.

The exhaust gas treatment system 10 generally includes one or more exhaust gas conduits 14, and one or more exhaust treatment devices. In the example illustrated in FIG. 1, the exhaust gas treatment system devices include an EHC 16, an OC 18, a hydrocarbon adsorber 20, an SCR 22, and a particulate filter (PF) device 24. It is to be understood that the OC 18, hydrocarbon adsorber 20, and SCR 22 may be referred to as catalytic exhaust system components. As can be appreciated, the exhaust gas treatment system 10 of the present disclosure may include various combinations of one or more of the exhaust treatment devices shown in FIG. 1, and/or other exhaust treatment devices (not shown), and is not limited to the present example. For example, the EHC 16 may be located in a different position along the exhaust gas flow pathway. Likewise, the SCR 22 may be positioned upstream from the other components.

In FIG. 1, the exhaust gas conduit 14, which may include several segments, transports exhaust gas 15 from the IC engine 12 to the various exhaust treatment devices of the exhaust gas treatment system 10. The EHC 16 is disposed upstream of the OC 18, the hydrocarbon adsorber 20, the SCR 22, and the PF 24. The EHC 16 includes a monolith 30 and an electrical heater 32, where the electrical heater 32 is selectively activated and heats the monolith 30. The electrical heater 32 is connected to an electrical power source, for example the alternator 6, the battery 9, and/or the ultracapacitor 8 as disclosed herein. In one example, the electrical heater 32 operates at a voltage of about 12 volts to about 24 volts and at a power range of about 1 kilowatt (kW) to about 5 kilowatts (kW); however it is to be understood that other operating conditions may be used as well. The EHC 16 may be constructed of any suitable material that is electrically conductive such as the monolith 30, which includes wound or stacked metal, or metallic foams. An oxidation catalyst compound (not shown) may be applied to the EHC 16 as a wash coat and may contain platinum group metals such as platinum (Pt), palladium (Pd), rhodium (Rh) or other suitable oxidizing catalysts, or combinations thereof.

The OC 18 is located downstream of the EHC 16 and may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combinations thereof. The OC 18 is useful in treating unburned gaseous and non-volatile HC and CO, which are oxidized to form carbon dioxide and water.

The hydrocarbon adsorber 20 is located downstream of the EHC 16 and includes, for example, a flow-through metal or ceramic monolith substrate. The substrate can include a hydrocarbon adsorber compound disposed thereon. The hydrocarbon adsorber compound may be applied as a wash coat and may contain materials such as, for example, zeolite, Pd, Rh, or other suitable HC adsorbers or combinations thereof. The hydrocarbon adsorber 20 is configured for reducing the emissions of HC during an engine cold start condition when the OC 18 and the SCR 22 have not heated to the respective light-off temperatures and are not active by acting as a mechanism for storing fuel energy. Specifically, the hydrocarbon adsorber 20 is used to store fuel or hydrocarbon during a cold start. The EHC 16 provides heat to the hydrocarbon adsorber 20 to initiate an exothermic reaction. The heat created by the ignited fuel will thereby generate an exotherm, which quickly heats the exhaust treatment devices that are located downstream of the hydrocarbon adsorber 20. In the example illustrated in FIG. 1, the OC 18 and the hydrocarbon adsorber 20 are combined together into a single, integrated component, and share a common catalyst substrate 21. In one example, the substrate 21 includes a honeycomb structure, where the oxidization catalyst and the hydrocarbon adsorber are applied to the surface of the substrate 21 as a wash coat.

An HC/fuel injector 40 may be located upstream of the hydrocarbon adsorber 20 in fluid communication with the exhaust gas 15 in the exhaust gas conduit 14. The HC/fuel injector 40 is in fluid communication with an HC supply (not shown), and is configured to introduce an unburned HC 25 into the exhaust gas stream for delivery to the hydrocarbon adsorber 20. A first mixer or turbulator 44 may also be disposed within the exhaust conduit 14, in close proximity to the HC/fuel injector 40, to further assist in thorough mixing of the HC 25 with the exhaust gas 15 to create an exhaust gas and hydrocarbon mixture. The hydrocarbon adsorber 20 is used to selectively adsorb hydrocarbon from the exhaust gas and hydrocarbon mixture.

The SCR 22 may be disposed downstream of the OC 18. In a manner similar to the OC 18, the SCR 22 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a mesoporous material (e.g., zeolite, SAPO (silico-alumino-phosphate)) and one or more base metal components such as iron (Fe), cobalt (Co), copper (Cu) or vanadium (V) which can operate efficiently to convert $NO_x$ constituents in the exhaust gas 15 in the presence of a reductant 26 such as ammonia ($NH_3$).

An ammonia ($NH_3$) reductant 26 may be supplied from a reductant supply source (not shown) and may be injected into the exhaust gas conduit 14 at a location upstream of the SCR 22 using an injector 46, or other suitable method of delivery of the reductant 26 to the exhaust gas 15. The reductant 26 may be in the form of a gas, a liquid, or an aqueous urea solution and may be mixed with air in the injector 46 to aid in the dispersion of the injected spray. A second mixer or turbulator 48 may also be disposed within the exhaust conduit 14 in close proximity to the injector 46 to further assist in thorough mixing of the reductant 26 with the exhaust gas 15.

The PF 24 may be disposed downstream of the SCR 22. The PF 24 operates to filter the exhaust gas 15 of carbon and other particulates. In examples, the PF 24 may be constructed using a ceramic wall flow monolith filter 23 that may be packaged in a shell or canister constructed of, for example, stainless steel, and that has an inlet and an outlet in fluid communication with exhaust gas conduit 14. The ceramic wall flow monolith filter 23 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is to be understood that the ceramic wall flow monolith filter 23 is merely exemplary in nature, and that the PF 24 may include other filter devices such as wound or packed fiber filters, open cell foams, sintered metal fibers, etc.

With further reference to FIG. 1, control module 50 receives input from various sources (e.g., temperature sensors 52, 54, 56, and 60). The control module 50 is operably connected to the electrical heater 32. The control module 50 includes control logic for monitoring (and/or determining) the temperature of the OC 18 and selectively activating (and/or regulating) the electrical heater 32 based on the temperatures monitored. If the temperature of the OC 18 is below a threshold value (the light-off temperature or minimum operating temperature of the OC 18), then the EHC 16 is activated. In one example, the threshold value of the OC 18 is about 250° C., depending on the concentration of inlet HC concentration. It is to be understood that the control module 50 may also be referred to as a control element 50.

The control module 50 also has control logic for determining the amount of hydrocarbon that has been adsorbed by the hydrocarbon adsorber 20. That is, the control module 50 includes control logic for monitoring the amount of hydrocarbon or fuel 25 that has been emitted into the exhaust gas stream 15 by the HC/fuel injector 40 and adsorbed within the hydrocarbon adsorber 20. The memory of the control module 50 stores a threshold hydrocarbon value, which indicates the maximum amount of hydrocarbon that the hydrocarbon adsorber 20 is capable of adsorbing. The maximum amount of hydrocarbon is based on the amount of hydrocarbon adsorber compound deposited on the substrate of the hydrocarbon adsorber 20.

The control module 50 includes control logic for determining if the amount of hydrocarbon adsorbed by the hydrocarbon adsorber 20 is less than the threshold hydrocarbon value of the hydrocarbon adsorber 20. The control module 50 further includes control logic to activate the HC/fuel injector 40 when the control module 50 determines that the threshold hydrocarbon value has not been met. Upon activation, the HC/fuel injector 40 introduces the unburned HC 25 into the exhaust gas stream for delivery to the hydrocarbon adsorber 20. If the control module 50 determines that the threshold hydrocarbon value has been met, then the control module 50 further includes control logic for deactivating the HC/fuel injector 40. Alternatively, the HC/fuel injector 40 may be omitted, and the control module 50 may modify operating parameters of the engine 12 to control the hydrocarbon levels in the exhaust gas 15. Specifically, the control module 50 adjusts the engine timing and rate/frequency of fueling to deliver excess, unburned fuel into the exhaust gas conduit 14 for mixing with the exhaust gas 15.

The control module 50 includes control logic for monitoring the temperature of the EHC 16. The monitoring may include measurement of EHC temperatures by one or more temperature sensors, or calculation of EHC temperatures. EHC temperatures may be calculated using calculation inputs including exhaust flow of the engine, input gas temperature of the engine, and electrical power provided to the electrical heater 32. Exhaust flow of the engine 12 may be calculated by adding the intake air mass of the engine and the fuel mass of the engine where intake air mass is measured using an intake air mass flow sensor of the engine measuring air mass flow entering the engine 12. The fuel mass flow may be measured by summing the total amount of fuel injected into the engine 12 over a given period of time. The fuel mass flow may be added to the air mass flow rate to calculate the exhaust flow of the engine.

The control module 50 includes control logic for determining if the temperature of the EHC 16 is above a threshold or EHC light-off temperature. The EHC light-off temperature is the temperature at which rapid HC oxidation occurs within the oxidation catalyst compound (not shown) of the EHC 16. In one example, the EHC light-off temperature is about 250° C. If the temperature of the EHC 16 is above the EHC light-off temperature, then the control module 50 includes control logic for introducing hydrocarbon 25 into the exhaust gas 15. Specifically, the hydrocarbon 25 is introduced into the exhaust gas 15 and is trapped by the adsorber 20 until the OC 18 is heated to an OC threshold or light-off temperature. The OC light-off temperature is the temperature at which unburned gaseous and non-volatile HC and CO are oxidized in the OC 18 and form carbon dioxide and water.

The amount of hydrocarbon introduced into the exhaust gas 15 is based on the temperature of the OC 18 as well as the maximum amount of hydrocarbon that may be trapped by the adsorber 20 prior to the OC 18 light-off. Specifically, the memory of the control module 50 stores a value (OC Volume) that indicates the maximum amount of hydrocarbon that can be stored within the adsorber compound of the substrate of the adsorber 20. The OC Volume depends on the amount of hydrocarbon that is applied to the substrate of the adsorber 20. In one example, the control module 50 may include control logic for activating the HC/fuel injector 40 to introduce the hydrocarbon 25 into the exhaust gas stream 15. Alternatively, the control module 50 may modify operating parameters of the engine 12 to control the hydrocarbon levels in the exhaust gas 15.

The control module 50 further includes control logic for determining the temperature profile of the SCR 22 based on the temperature sensors 54, 56. The temperature profile of the SCR 22 represents the overall temperature of the SCR 22, and is based on a temperature T2 detected by the temperature sensor 54, and a temperature T3 detected by the temperature sensor 56. The control module 50 includes control logic for averaging the temperature T2 and the temperature T3 together, where the average of the temperature T2 and the temperature T3 is the temperature profile of the SCR 22 (Tavg SCR). It should be noted that while FIG. 1 illustrates two temperature sensors 54, 56, in another example the temperature sensors 54, 56 may be omitted. Instead, the control module 50 may include control logic for calculating temperature profile Tavg SCR of the SCR 22 based on the operating conditions of the exhaust gas system 10 and the engine 12, as well as the mass of the SCR 22. Specifically, the temperature profile Tavg SCR of the SCR 22 may be calculated based on the exhaust gas inlet temperature that is measured by a temperature sensor (not shown) located in the exhaust gas conduit 14 upstream of the OC 18, the mass flow rate or exhaust flow of the engine 12, and the mass of the SCR unit 22. The exhaust flow of the engine 12 may be calculated by adding the intake air mass of the engine 12 and the fuel mass of the engine 12. The intake air mass may be measured using an intake air mass flow sensor (not shown) of the engine 12, which measures air mass flow entering the engine 12. The fuel mass flow may be measured by summing the total amount of fuel injected into the engine 12 over a given period of time. The fuel mass flow may be added to the air mass flow rate to calculate the exhaust flow of the engine 12.

The control module 50 includes control logic for selectively deactivating the EHC 16 based on the temperature profile Tavg SCR of the SCR 22. Specifically, if the temperature profile Tavg SCR of the SCR 22 is above a light-off or minimum operating temperature, then the electrical heater 32 is deactivated, and no longer heats the EHC 16. However, as long as the temperature profile Tavg SCR of the SCR 22 is below the light-off temperature, the electrical heater 32 remains activated, and heat is provided to the SCR 22. The SCR 22 is heated to the light-off temperature and converts the reductant 26 into ammonia and generally effectively reduces the amount of $NO_x$ in the exhaust gas 15. Thus, the exhaust gas treatment system 10 includes the EHC 16 for providing heat to the OC 18, which in turn heats the OC 18 to the respective light-off temperatures more quickly when compared to an exhaust gas treatment system that does not include an EHC 16.

The exhaust gas treatment system 10 may also include the EHC 16 and the hydrocarbon adsorber 20 for decreasing the time needed for the SCR 22 to reach the respective light-off temperature. Specifically, the hydrocarbon adsorber 20 stores HC 25 injected into the exhaust gas 15 until the HC 25 is ignited by heat provided by the EHC 16 and the OC 18. The heat created by the ignited fuel will thereby generate heat that is directed downstream of the hydrocarbon adsorber 20 to the SCR 22. Therefore, providing an EHC 16 and a hydrocarbon adsorber 20 allows for the exhaust gas treatment system 10 to insert HC 25 into the exhaust gas 15 prior to the SCR 22 reaching light-off. The HC 25 stored in the hydrocarbon adsorber 20 acts as stored energy, where the stored energy is released in an exothermic reaction when the HC 25 is ignited by the heat created by EHC 16. This exotherm provides heat to the SCR 22, which in turn allows for the SCR 22 to be heated to its respective light-off temperature more quickly when compared to an exhaust gas treatment system that does not include an EHC 16 and hydrocarbon adsorber 20.

In examples according to the present disclosure, control module 50 may operate by a method as follows. Temperatures are calculated or detected at the OC 18. In a temperature comparison step, the control module 50 determines if the OC temperature is above a predetermined light-off temperature for the OC 18. If the OC temperature is below the light-off temperature, the EHC 16 is triggered to power on. At the HC adsorber 20, the amount of HC 25 is detected or calculated. The control module 50 determines if there is enough HC 25 by comparing the detected or calculated amount to a predetermined set-point. If enough HC 25 is detected or calculated at the HC adsorber 20, the control module 50 deactivates the addition of fuel (whether by post-injector or by engine management). If not enough HC 25 is detected, the control module 50 activates the addition of fuel (by post-injector or by engine management). EHC temperatures may be detected or calculated. The control module 50 determines if the EHC 16 has reached light-off temperature. If not, the control module 50 restarts the cycle (moving back to the temperature comparison step). If EHC 16 is at or above the light-off temperature, HC 25 is introduced into the HC adsorber 20 until OC light-off. The SCR device temperature is similarly detected or calculated. The control module 50 then determines if the SCR 22 has reached light-off temperature. If the SCR 22 has reached threshold temperature, the control module 50 deactivates the EHC 16. If not, the control module 50 operation method returns back to the temperature comparison step. As such, light-off temperatures of the OC 18 and the SCR 22 may be examples of lower and upper control limits, respectively, for the control module 50 to regulate the temperatures of the EHC 16 and the SCR 22. It is to be understood that the lower and upper control limits may apply lower and upper bounds from a single location, or a plurality of locations. For example, the lower control limit may be the lower bound for the EHC 16 temperature, however, the upper control limit for the EHC 16 may depend on a temperature of a device other than the EHC—for example, the SCR 22 temperature. It is to be further understood that more than one lower and upper control limit may be established to regulate a single device. For example, there may be a maximum temperature for the EHC 16 at which the EHC is no longer electrically heated even if the SCR 22 has not reached the target temperature.

For EHC system integration, it may be useful to predict and determine the amount of energy necessary to heat the EHC in the exhaust stream. Although the efficiency of an electric heater in converting electrical energy to thermal energy may be almost 100%, the resistance of the EHC 16 may change in certain environments. In some vehicles, the battery 9 and an on-board generator (e.g., an alternator 6) may be the only sources for providing electric current; the electrical power may be therefore limited by the capacity of those two on-board devices.

Test results have shown an example of how the EHC temperature may respond to electrical power input during the idle mode from a cold-start. For a 20 second idle period, the EHC temperature linearly increased as a function of power, and 1 kW raised EHC temperature approximately 5° C. per every second of the heating rate. Baseline tests show that without the assistance of electrical power, the EHC temperature stayed below 50° C. for as long as 20 seconds after the engine start up.

When the engine runs at steady-state, the temperature profile of the EHC 16 has also been shown in tests to be mostly linear and well correlated with the electrical power input. Assuming that an alternator 6 typically generates from about 120 amperes to about 150 amperes at 12 VDC, it may only produce from about 1 kW to about 2 kW electric power with around 70% conventional generator efficiency. Some alternators 6 can produce higher voltage (from about 24V to about 36 V) while maintaining the level of current, thereby producing higher power. (Power is the product of current and voltage.) However, since many vehicle electrical/electronic components run at 12V, the battery may be called upon to supply all of the power to the 12V systems while the alternator 6 is outputting a higher voltage. This may deplete the battery 9. In such a vehicle having an alternator 6 and battery 9 sized to meet 12V system power loads, there may be insufficient electrical stored energy to heat the exhaust system effectively. As such, the heat required to efficiently reduce NOx may typically come from on-board chemical energy, fuel.

The energy density of diesel fuel, for example, is high like other fossil fuels; combusting 0.023 g/s of diesel fuel may yield about 1 kW power. Catalytic combustion over the OC 18 may convert the HC chemical energy to thermal energy. For diesel fuel, however, light-off requires a relatively high activation temperature (e.g., approximately 250° C.). The estimated temperature gain per 1 kW from the diesel fuel is therefore very similar to that achieved from the 1 kW electric power via EHC 16 as discussed above. Because of losses in generation and storage of electric power, this comparative result (absent regenerative braking energy as disclosed herein) may suggest that it is more efficient to use the unburned hydrocarbon fuel directly to heat up the EHC 16 rather than to burn fuel in the engine to drive the alternator with all of the losses in efficiency. However, the diesel fuel cannot be effectively used at the beginning of cold-start because the OC 18 is below the activation temperature for the diesel fuel.

To effectively allow the fuel injection upon a cold start, the OC 18 may require EHC assistance to bring the temperature to the selected threshold point. In an experiment, the temperature of 250° C. was selected to be the threshold temperature where the OC 18 fully converts the post-injected fuel. From the experiment, under a transient cycle, the EHC temperature no longer increases linearly as a function of power. After a 20 second idle period, higher mass flow during acceleration cools down the EHC 16, delaying reaching the threshold temperature. In an example as tested with 3 kW of EHC power, it took approximately 70 seconds to reach the threshold temperature, however, less than 15 seconds was needed to reach the threshold temperature when the OC 18 was heated up by a 5.8 kW power input. The overall electrical energy requirement for the EHC 16 to produce the threshold temperature has been estimated, suggesting that higher peak EHC input power offers lower overall energy consumption and ultimately better fuel economy.

Figure 2:
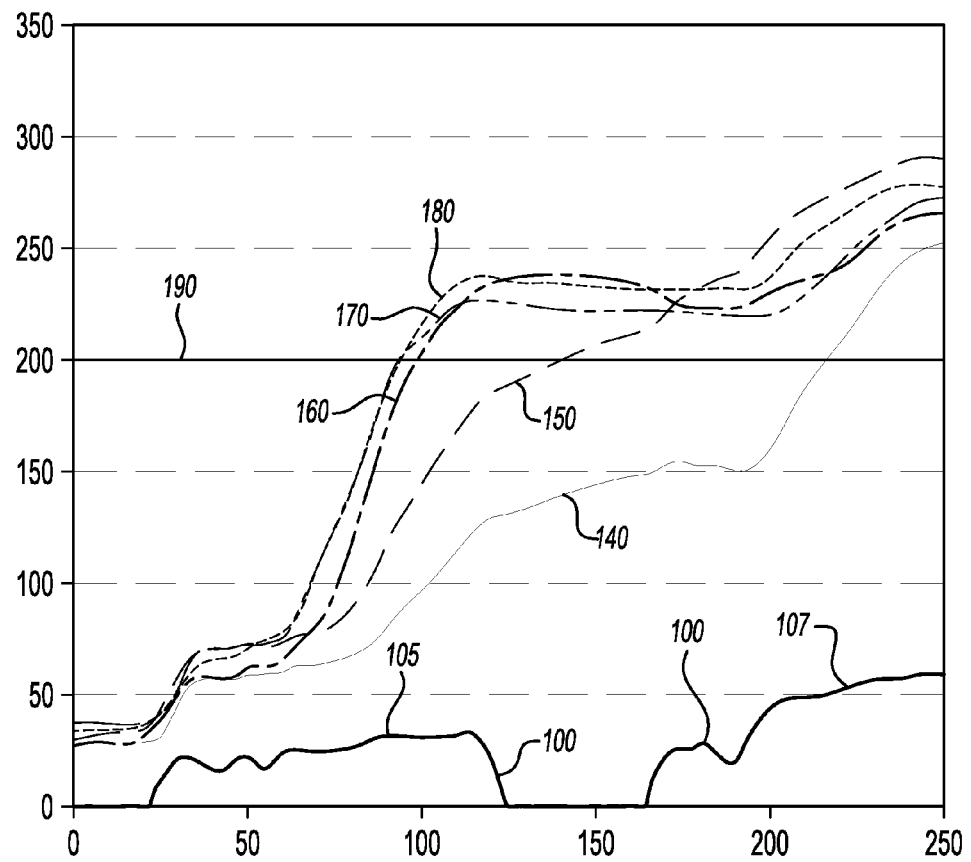
FIG. 2 is a graph depicting examples of SCR temperatures over time with various EHC power inputs according to the present disclosure.

Cold-start strategies have been shown to produce exhaust temperatures that rapidly increase to above 300° C. within 20 seconds with the EHC integrated system while the temperatures have stayed below 50° C. without the electrical energy. The conversion efficiency of engine out HC and CO emissions is significantly improved over OC 18 with the rapid warm-up; however a large fraction of heat from the EHC 16 is transferred to the OC converter, a big thermal mass. Therefore, it takes additional time to bring the SCR to its active temperature. EHC assistance requires a certain peak power before showing a significant improvement in SCR performance and time to reach activation temperature. Tests were completed measuring SCR temperatures with various EHC peak power inputs, with results shown generally in FIG. 2. The ordinate of FIG. 2 is temperature in centigrade, and the abscissa is time in seconds. The power level for traces at each reference numeral is as follows: trace reference numeral 150 indicates 2.9 kW; trace reference numeral 160 indicates 4.0 kW; trace reference numeral 170 indicates 4.8 kW; and trace reference numeral 180 indicates 5.8 kW. The trace at reference numeral 100 indicates vehicle speed. SCR operation temperature is shown to be at least 200° C., as indicated by the horizontal trace at reference numeral 190. The baseline test without EHC is shown at the trace at reference numeral 140. The baseline test showed that it took more than 200 seconds to activate the SCR 22 for $NO_x$ reduction, which resulted in relatively low $NO_x$ conversion for the first and second cycles during the federal test procedure developed by US government. The first cycle is shown at reference numeral 105, and the second cycle is shown at reference numeral 107. With the assistance of the EHC 16, there was an improvement observed for the second cycle, and the $NO_x$ conversion was increased. This testing suggested that the level of benefit from the EHC 16 is not proportional to the faster warm-up time, and the strategy may be tunable for an improved overall efficiency.

Engine-out $NO_x$ is influenced by engine speed and load, and $NO_x$ levels may significantly increase during acceleration due to high flow rates. Low $NO_x$ efficiency during cold start may sometimes require the engine to burn excess fuel using in-cylinder or downstream post-injection methods to raise the temperature of the SCR catalyst. However, with improved cold-start $NO_x$ emission, the engine could reduce fuel consumption while the system still meets the emission standard.

Regenerative braking systems may be used to recapture energy from the vehicle during deceleration. Generally, regenerative braking is the conversion of the vehicle's kinetic energy into a source of electrical power. The vehicle's kinetic energy is converted in response to a user request to slow or stop the vehicle. A generator is manipulated, and accordingly, produces electrical energy as it applies a stopping force to the vehicle's axle and/or drive train in response to a stopping request. Therefore, and in accordance with regenerative braking, the kinetic energy is converted to electric energy, as the vehicle begins to slow down.

Examples of the present disclosure may include a conventional alternator applied in a new way to generate electrical power during vehicle deceleration. Rather than allowing the engine speed to decay to idle during vehicle deceleration, the engine is driven by the driveline until the speeds become too low to keep the engine running. When the speed gets too low, the engine is decoupled from the driveline.

Regenerative braking may be applied to provide the extra thermal energy required for increasing the SCR temperature by 20-25° C. Without regenerative braking, the kinetic energy of the vehicle may be lost as heat to the environment. Regenerative braking energy is recovered waste energy. Fuel consumption may be reduced by using the recovered waste energy in the place of energy supplied by a fuel burning engine driven alternator, and/or in place of the energy of catalytic combustion of fuel in the exhaust.

Figure 3:
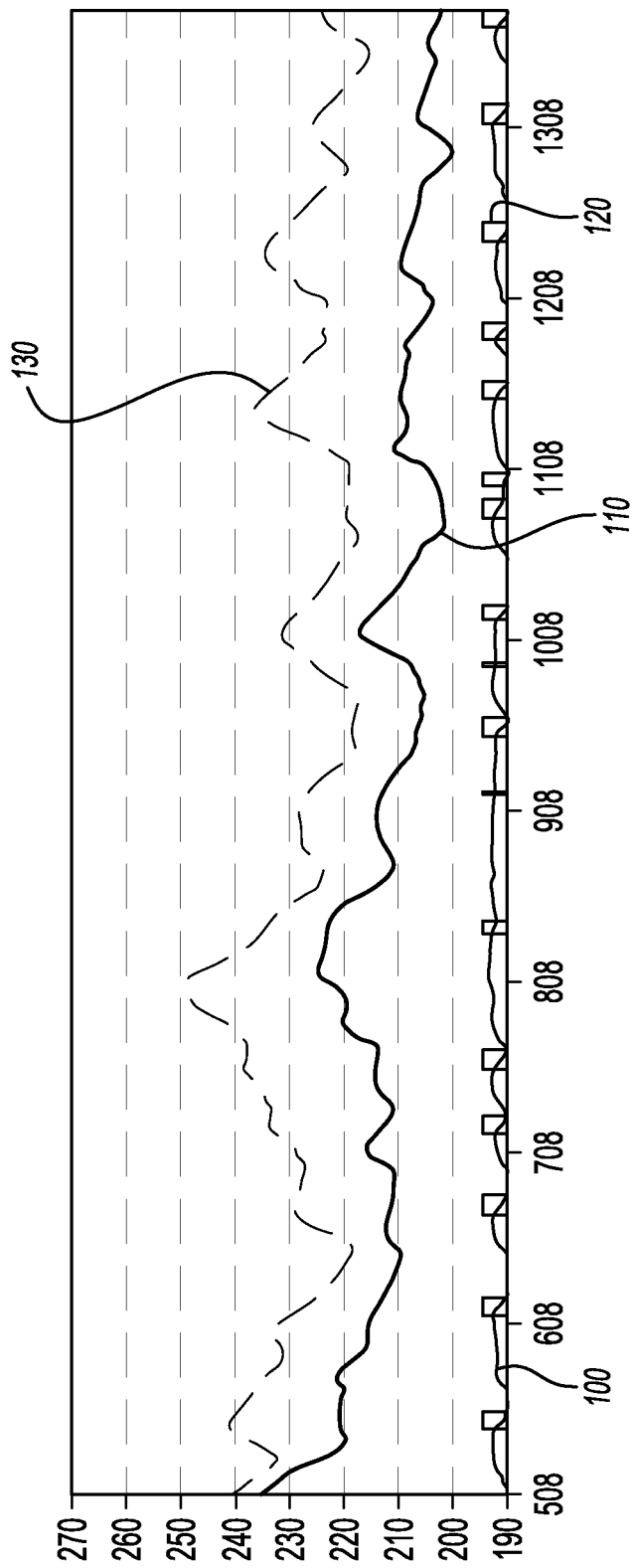
FIG. 3 shows graphs of examples of SCR temperatures over time with and without EHC according to the present disclosure.

During braking events, a vehicle contains a substantial amount of kinetic energy. Through regenerative braking, only a small fraction of the available braking energy would be sufficient to supply the energy to heat the exhaust system to an efficient temperature. In an example of the present disclosure, given 137 seconds of braking of a 9000 lb vehicle, 4-6 kW of power may be generated by regenerative braking, with a possible 550-680 kJ (kilojoules) of energy that could be recovered. In an example of the present disclosure, electrical energy captured in regenerative braking may be supplied to the EHC 16. The supply may be either direct from the alternator 6 or by way of a DC-DC converter. Using an external power supply, testing simulated the regenerative braking during the driving cycle. FIG. 3 shows vehicle test results with 2.8-5.6 kW of EHC power applied mostly at the end of each cycle. The ordinate of FIG. 3 is temperature in centigrade, and the abscissa is time in seconds. Vehicle speed is indicated by the trace at reference numeral 100. The rectangular traces along the abscissa, shown by reference numeral 120, indicate power being applied to the EHC. The trace at reference numeral 110 indicates the SCR temperature in a test without EHC. The trace at reference numeral 130 indicates the SCR temperature with EHC.

The heating capacity of the EHC systems in some vehicles may be limited by the power available to the EHC 16. In such a vehicle, EHC 16 power may be supplied by the alternator 6 and battery 9 of the vehicle. The alternator 6 may be regulated at about 1-2 kW with voltages at about 12 volts to about 14 volts (assuming current ranges from about 120 Amps to about 150 Amps). However, by operating at a voltage range from about 24 volts to about 36 volts, an alternator 6 producing the same amount of current (from about 120 Amps to about 150 Amps) can produce from about 4 kW to about 6 kW.

It is to be understood that the alternator 6 produces DC power from AC power by use of a rectifier. For example, the alternator 6 may operate with an integrated bridge rectifier to convert three-phase alternating current to DC power. A voltage regulator 7 serves to maintain the alternator 6 at constant voltage counteracting wide ranges of fluctuations in alternator speed and load. In examples of the present disclosure, the alternator 6 may be mounted as a conventional, FEAD (Front End Accessory Drive) driven alternator. The alternator 6 may also be an alternator-starter.

The drivetrain 4 may be selectively coupled to the engine by use of a clutch 5, wherein the selective coupling may be controlled by a regenerative braking controller 70. The regenerative braking controller 70 may regulate the flow of electrical energy into the ultracapacitor 8. Charging the ultracapacitor 8 may be direct via the alternator 6 at an alternator output voltage or indirect through a DC-DC converter at a higher voltage. For example, the alternator 6 may be regulated during regenerative braking events to output 24-36 VDC and to output 12 VDC when the vehicle is not in a regenerative braking mode. In another example, the alternator may be regulated to output nominally 12 VDC at all times, however a DC-DC converter may step up the voltage for charging the ultracapacitor. In still a further example, the alternator may be regulated to output substantially the same voltage at all times and charge the ultracapacitor directly. The control element 50 may control flow of electrical power to the EHC 16 from the ultracapacitor 8. Ultracapacitor charging occurs during coast down (i.e., during periods of deceleration). In an example disclosed herein, regenerative braking provides power to the EHC 16 to replace SCR heat lost over long idle periods. An effective SCR temperature is maintained by electrical power from the ultracapacitor using recovered energy just-in-time when the catalyst needs heat for maximum efficiency. Ultracapacitor discharge to the EHC 16 may occur during idle and acceleration. The ultracapacitor discharge may also power accessory loads thereby reducing generator/alternator torque load and further reducing fuel consumption.

As used herein, a charging voltage means a voltage that is applied across a battery or capacitor that is sufficient to cause the battery or capacitor to store electrical energy. In a battery, the charging voltage is greater than the nominal voltage of the battery. For example, the charging voltage of a nominal 12 volt lead-acid battery may, for example range from about 13 to about 18 Volts. A capacitor substantially does not have a lower limit for the charging voltage. When a charging voltage is connected across a discharged capacitor, the capacitor voltage will asymptotically approach the charging voltage as electrical energy is stored in the capacitor. If a higher charging voltage is applied, the capacitor charges faster, and stores more energy compared to the same capacitor with a lower charging voltage applied.

As disclosed herein, benefits of an ultracapacitor 8 over a lead-acid battery 9 include fast rates of charge and discharge of electrical energy, long operational lifetime, and high durability. In examples of the present disclosure, EHC power supplied by ultracapacitor discharge may include energy values ranging from 50-100 kJ. An ultracapacitor 8 of 60 F to 120 F (Farads) may be used working over 48 V (maximum charged voltage) to 16 V (minimum discharge voltage). An ultracapacitor 8 of 500 F to 1000 F working over 16 V (maximum charged voltage) to 5 V (minimum discharge voltage) may also be used. The ultracapacitor may also include a cooling system. It is to be understood that as used herein, an ultracapacitor means an electric double-layer capacitor. An ultracapacitor may also be known as a supercapacitor.

It is to be understood use of the words "a" and "an" and other singular referents may include plural as well, both in the specification and claims, unless the context clearly indicates otherwise.

Further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Yet further, it is to be understood that the ranges provided herein include the stated range and any value or sub-range within the stated range. For example, a range from about 120 amperes to about 150 amperes should be interpreted to include not only the explicitly recited limits of about 120 amperes to about 150 amperes, but also to include individual values, such as 130 amps, 142 amps, 149 amps, etc., and sub-ranges, such as from about 120 amps to about 125 amps, from about 130 amps to about 145 amps, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. A vehicle, comprising:
    an internal combustion engine operatively disposed within the vehicle, the engine to generate exhaust gases, the engine having a front end accessory drive (FEAD);
    an alternator operatively connected to the engine to be driven by the FEAD, the alternator producing DC power;
    an ultracapacitor operatively connected to the alternator to receive electrical energy therefrom;
    an exhaust gas treatment system operatively connected to the engine to receive exhaust gases therefrom, the exhaust gas treatment system including an electrically heated catalyst (EHC) device electrically connected to the ultracapacitor to selectively heat a catalytic exhaust system component wherein the ultracapacitor stores energy converted by the alternator from vehicle kinetic energy during vehicle deceleration and releases the stored energy to heat the EHC; and
    a regenerative braking controller operatively connected to a drivetrain to control a clutch to selectively couple the drivetrain to the engine during deceleration of the vehicle to drive the engine at a speed above an engine idle speed, thereby driving the alternator through the FEAD and converting vehicle kinetic energy to electrical energy to store in the ultracapacitor.

2. The vehicle as defined in claim 1 wherein the regenerative braking controller regulates the flow of electrical energy into the ultracapacitor.

3. The vehicle as defined in claim 2 wherein the ultracapacitor is electrically charged by the alternator directly at an alternator output voltage or indirectly through a DC-DC converter at a charging voltage greater than the alternator output voltage.

4. The vehicle as defined in claim 3, further comprising a control element to control a flow of electrical power to the EHC from the ultracapacitor.

5. The vehicle as defined in claim 4 wherein the control element determines a respective temperature of the EHC and of the catalytic exhaust system component.

6. The vehicle as defined in claim 5 wherein the control element determines the respective temperature of the EHC and of the catalytic exhaust system component by direct measurement or by calculation from operating parameters of the vehicle.

7. The vehicle as defined in claim 4 wherein the control element regulates the respective temperatures of the EHC and the catalytic exhaust system component between respective predetermined upper and lower control limits by controlling a flow of electrical power to the EHC from the ultracapacitor.

8. The vehicle as defined in claim 1 wherein the ultracapacitor is an electric double-layer capacitor.

9. The vehicle as defined in claim 1 wherein the ultracapacitor has an electrical energy storage capacity from about 50 kilojoules to about 100 kilojoules.

10. A method of converting constituent gases in an internal combustion engine exhaust gas mixture, the method comprising:
    operatively connecting an alternator to an internal combustion engine to produce DC power by driving the alternator via a front end accessory drive (FEAD) of the engine;
    operatively connecting an ultracapacitor to the alternator to receive electrical energy therefrom;
    operatively connecting an exhaust gas treatment system to the engine to receive exhaust gases therefrom, the exhaust gas treatment system including an electrically heated catalyst (EHC) device electrically connected to the ultracapacitor to selectively heat a catalytic exhaust system component wherein the ultracapacitor stores energy converted by the alternator from vehicle kinetic energy and releases the stored energy to heat the EHC; and
    operatively connecting a regenerative braking controller to a drivetrain to control a clutch to selectively couple the drivetrain to the engine during deceleration of the vehicle to drive the engine at a speed above an engine idle speed, thereby driving the alternator through the FEAD and converting vehicle kinetic energy to electrical energy to store in the ultracapacitor.

11. The method as defined in claim 10 wherein the regenerative braking controller regulates the flow of electrical energy into the ultracapacitor.

12. The method as defined in claim 11 wherein the ultracapacitor is electrically charged by the alternator directly at an alternator output voltage or indirectly through a DC-DC converter at a charging voltage greater than the alternator output voltage.

13. The method as defined in claim 12, further comprising controlling a flow of electrical power to the EHC from the ultracapacitor.

14. The method as defined in claim 13 further comprising determining a respective temperature of the EHC and of the catalytic exhaust system component.

15. The method as defined in claim 14, further comprising determining the respective temperature of the EHC and of the catalytic exhaust system component by direct measurement or by calculation from operating parameters of the vehicle.

16. The method as defined in claim 13, further comprising regulating the respective temperatures of the EHC and the catalytic exhaust system component between respective predetermined upper and lower control limits by the controlling of the flow of electrical power to the EHC from the ultracapacitor.

17. The method as defined in claim 10 wherein the ultracapacitor is an electric double-layer capacitor.

18. The method as defined in claim 10, further comprising storing from about 50 kilojoules to about 100 kilojoules of electrical energy in the ultracapacitor.

* * * * *